United States Patent [19]

Boen et al.

[11] Patent Number: 5,367,532
[45] Date of Patent: Nov. 22, 1994

[54] FURNACE FOR THE CONTINUOUS MELTING OF OXIDE MIXTURES BY DIRECT INDUCTION WITH HIGH FREQUENCY, A VERY SHORT REFINING TIME AND A LOW ENERGY CONSUMPTION

[75] Inventors: Roger Boen, St. Alexandre; Christian Ladirat, Saint Laurent des Arbes; Jean-Pierre Gnilka, Venejan; Henri Pilliol, Avignon, all of France

[73] Assignee: Commissariat a l'Energie Atomique, France

[21] Appl. No.: 946,298
[22] PCT Filed: Mar. 4, 1992
[86] PCT No.: PCT/FR92/00199
§ 371 Date: Nov. 2, 1992
§ 102(e) Date: Nov. 2, 1992
[87] PCT Pub. No.: WO92/15531
PCT Pub. Date: Sep. 17, 1992

[30] Foreign Application Priority Data

Mar. 5, 1991 [FR] France ............... 91 02596

[51] Int. Cl.$^5$ ........................................ H05B 6/22
[52] U.S. Cl. ........................ 373/156; 373/35; 373/142; 373/144; 373/509; 373/134.7; 373/135.6
[58] Field of Search ........................ 373/27-28, 373/30, 33-35, 44-45, 72, 83, 115, 122, 142, 146, 155, 156, 151, 157; 65/123, 178, 100, 327, 335, 1; 219/10.491

[56] References Cited

U.S. PATENT DOCUMENTS

| | | | |
|---|---|---|---|
| 1,603,221 | 10/1926 | Thomson | 373/151 |
| 1,684,800 | 9/1928 | Maximoff et al. | 373/156 |
| 2,022,112 | 11/1935 | Ferguson | 373/35 |
| 2,485,851 | 10/1949 | Stevens | 373/27 |
| 2,747,006 | 5/1956 | Barnard | 373/28 |
| 3,244,495 | 4/1966 | Apple et al. | 373/35 |
| 3,531,574 | 9/1970 | Sterling et al. | 373/158 |
| 3,876,817 | 4/1975 | Bussy | 373/35 |
| 3,912,477 | 10/1975 | Brady et al. | 65/1 |
| 4,146,373 | 3/1979 | Sullivan et al. | 65/1 |
| 4,873,698 | 10/1989 | Boen | 373/156 |
| 5,109,389 | 4/1992 | Stenzel | 373/156 |

FOREIGN PATENT DOCUMENTS

| | | |
|---|---|---|
| 0118580 | 9/1984 | European Pat. Off. . |
| 0265051 | 4/1988 | European Pat. Off. . |
| 2589228 | 4/1987 | France . |
| 3724971 | 2/1988 | Germany . |
| 3824829 | 1/1990 | Germany . |
| 626972 | 7/1949 | United Kingdom . |
| WO9009211 | 8/1990 | WIPO . |

*Primary Examiner*—Teresa J. Walberg
*Assistant Examiner*—Tu Hoang
*Attorney, Agent, or Firm*—Pearne, Gordon, McCoy & Granger

[57] ABSTRACT

Furnace for the continuous melting of mixtures of oxides by direct induction at high frequency and a very short refining time and with a low energy consumption, comprising an intake (14) and a nozzle (15) for the continuous discharge of oxides into a metal crucible (3) having cold walls heated by a high frequency coil (5), characterized in that the height of the oxide bath is between 2 cm and 20% of the diameter of the metal crucible and in that the furnace hearth (4) is both transparent to the inducing magnetic field and sufficiently cooled to ensure the formation and maintenance of a protective solid crust at the bottom of the crucible.

6 Claims, 3 Drawing Sheets

FURNACE FOR THE CONTINUOUS MELTING OF OXIDE MIXTURES BY DIRECT INDUCTION WITH HIGH FREQUENCY, A VERY SHORT REFINING TIME AND A LOW ENERGY CONSUMPTION

The present invention relates in general terms to the continuous production of oxides melted in a furnace heated by high frequency, direct induction and having at its top an intake for the continuous distribution of the oxides to be melted and in its lower part a discharge nozzle fox the melted products.

More specifically, the present invention relates to such a direct induction melting furnace of the cold crucible type, i.e. whose side walls are cooled and therefore having a solid protective crust with respect to the oxide to be melted.

In most of the hitherto envisaged applications for such furnaces, materials based on oxides such as e.g. coloured glasses, glass-ceramics, crystal, etc., which were prepared had to undergo a prolonged refining, i.e. had to spend a long time in the furnace. This requirement and the design of the prior art furnaces has led to high specific electrical energy consumption levels, which are incompatible with the production of reduced refining melted oxides, such as are used in applications when the degree of refining is not determinative, such as e.g. enamels used for electrical household equipment or for the vitrification of waste.

A description will firstly be given of the present design of cold crucible direct induction furnaces by explaining their characteristics, the reasons for their high electrical power consumption and consequently their lack of suitability for producing reduced refining glasses of the types defined hereinbefore.

The direct induction furnaces at present in use in industry have a geometrical shape such that the melted oxide bath has a height roughly equal to its diameter. This shape has been chosen for three essential reasons. Firstly it makes it possible to ensure a good electrical transfer efficiency of the power between the induction coils and the melted material, because furnaces with a low bath height are considered to have a reduced efficiency. Secondly a significant melted product height ensures a long residence time for the same (roughly 10 hours) in the furnace and consequently allows advanced refining, which leads to the elimination of any bubbles and to the chemical and thermal homogenization of the complete liquid phase. Finally, the third reason for this dimensional choice results from problems linked with the furnace hearth because, to permit its cooling, it is made from metal and then constitutes a very prejudicial shield for the penetration into the molten bath of the electromagnetic field for heating the latter. Thus, in the case where the hearth is refractory, i.e. electrically insulating, most of the electromagnetic power emitted by the inductor is dissipated in the induced current penetration zone and this affects most of the mass of the bath. Conversely, if the hearth is made from metal cooled by water and this is a frequently encountered case, it constitutes a shield to the magnetic field and, by deforming the field lines, creates, as can be seen in FIG. 1 relative to the prior art, a zone 2 in which bath heating is reduced.

In FIG. 1, a furnace 1 has a cold crucible 3, an inductor 5 and a metal hearth 4. The curves 6 and 8 show the regions 10 where the induced currents penetrate the bath. In the annular zone 2 in the lower part of the bath directly surmounting the cooled metal hearth 4, there is a considerable restriction of the bath heating by the induced currents. Under these conditions, it can be readily gathered that an increase in the bath height decreases the significance of the phenomenon relative to the complete bath.

Unfortunately, the thus given extension to the furnace height, which correlatively conditions that of the lateral surface, in cold wall furnaces leads to heat losses through the vertical furnace walls, which are very high and with a flux density of e.g. 15 to 40 $W/cm^2$, as a function of the melting temperature of the mixture and its physical characteristics. The losses through the furnace hearth are lower and generally correspond to flux densities of between 5 and 15 $W/cm^2$. All these heat losses lead to very high specific electrical consumption levels, which often exceed 5 kWh/kg of melted product.

For example, a diameter 50 cm furnace, whose molten bath height is 50 cm can produce 30 kg/h of glass at 1300° C. The heat flow density towards the vertical walls is 30 $W/cm^2$, which leads to a heat loss of 236 kW. The heat flow density to the hearth is 10 $W/cm^2$, which leads to a heat loss of 20 kWh. It is necessary to have 0.5 kWh to melt 1 kg of glass and the electrical efficiency of the furnace is 80%, which leads to an energy consumption of 11.29 kWh/kg. These figures are prohibitive for standard industrial applications only requiring the preparation of products with a low refining level.

SUMMARY OF THE INVENTION

The present invention specifically relates to a furnace for the continuous melting of oxide mixtures by direct induction, which makes it possible to obtain with a very short refining time and a very low electrical energy consumption compared with that of the hitherto known furnaces, products which still have a considerable interest for certain industrial fields.

The invention therefore relates to a furnace for the continuous melting of mixtures of oxides by direct induction at high frequency and a very short refining time and with a low energy consumption, comprising an intake and a nozzle for the continuous discharge of oxides into a metal crucible having cold walls heated by a high frequency coil, characterized in that the height of the oxide bath is between 2 cm and 20% of the diameter of the metal crucible and in that the furnace hearth is both transparent to the inducing magnetic field and sufficiently cooled to ensure the formation and maintenance of a protective solid crust at the bottom of the crucible.

As can be seen, the invention results from the combination of two means, whose effects are combined in order to arrive at the sought energy result. The first means is the reduction of the height of the oxide bath compared with the crucible diameter and the second is a special construction of the furnace hearth enabling it to be both sufficiently transparent to the magnetic field to ensure a good penetration of the field lines and consequently induced heating currents of the bath into the latter and the maintenance by cooling of a solid protective crust at the bottom of the crucible.

Thus, it is known that in melting furnaces by direct induction in a cold crucible, melting takes place on the surface of the molten bath over a thickness of approximately 1 cm and that the time necessary for refining is much shorter than in a conventional hot crucible furnace. This finding, related to the disadvantage of high heat losses when the vertical furnace walls are high, has consequently led to the design of a very flat or shallow furnace, whose vertical walls are lower, which considerably reduces the contact surface between the molten bath and the vertical wall.

As such a reduction of the heat losses is only of interest if accompanied by the maintaining of a good electrical efficiency of the heating of the furnace, this latter consideration led to the elimination of the use of a cooled, solid metal hearth which, as explained relative to FIG. 1, constitutes an excessive shield for the penetration of the electromagnetic field above the hearth in most of the bath volume. For this reason, the furnace according to the invention has a hearth which is both transparent to the inducing magnetic field and sufficiently cooled to maintain a solid protective crust on the bottom of the crucible, so that the hearth is not attacked by the generally very corrosive molten bath.

To this end and in accordance with an important feature of the invention, the hearth has independent metal inserts embedded in a refractory material, each of the said metal inserts being constituted by a tube portion having an inlet and an outlet for the circulation of a cooling liquid.

In a hearth with such a mixed composition, it is the refractory material which is used for the passage of the magnetic field lines to the bath, whilst the independent metal inserts distributed in a discrete manner in the refractory material maintain for the entire hearth a sufficiently low temperature to permit the formation of a crust. To this end, each of the metal inserts constituted by an independent tubular portion has an inlet and an outlet for the circulation of the cooling liquid, which is usually water.

Finally, according to a preferred embodiment of the invention, the hearth is shaped like a circular plate, in which the metal inserts are distributed in the form of a series of concentric rings, each having several curved inserts separated from one another by the refractory material.

The invention is described in greater detail hereinafter relative to a non-limitative embodiment of an induction furnace and with reference to the attached FIGS. 1, 2 and 3, wherein show:

DETAILED DESCRIPTION OF THE PREFERRED EMBODIMENTS

Figure 1:
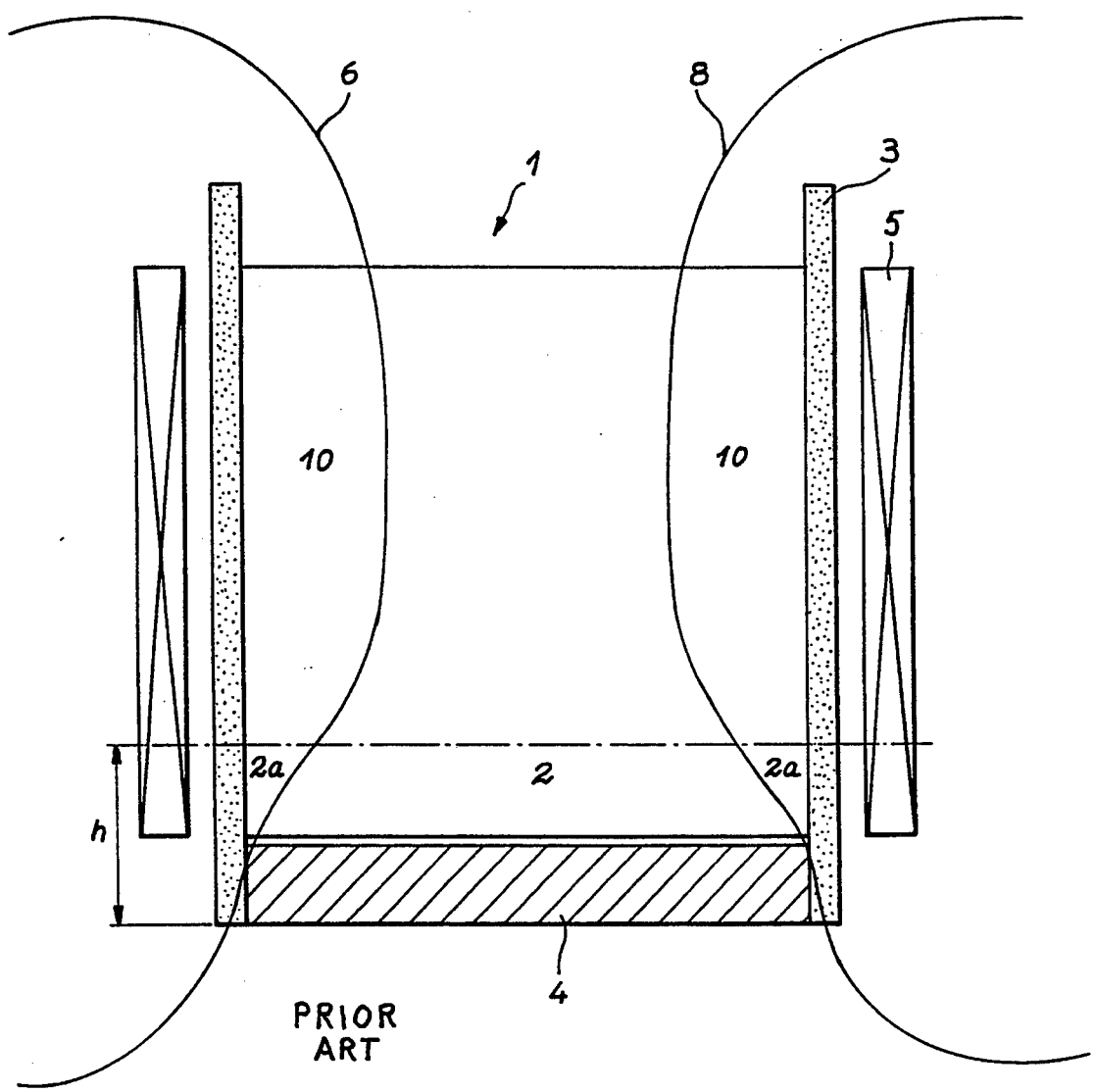
FIG. 1 A diagrammatic section view of a prior art furnace as already described.

It is pointed out that if the height of a conventional furnace like that shown in FIG. 1 was reduced and was e.g. given the height h indicated therein, the curves 6 and 8 defining the penetration zone of the induced currents in the molten bath would remain identical and heating would only take place then of the zones 2a positioned laterally in FIG. 1 and which only represent a small proportion of the bath volume. Thus, if tile furnace height reduction was not combined with a hearth permitting the passage of the magnetic flux, it would become impossible and illusory to melt the mass of oxides deposited in said furnace.

Figure 2:
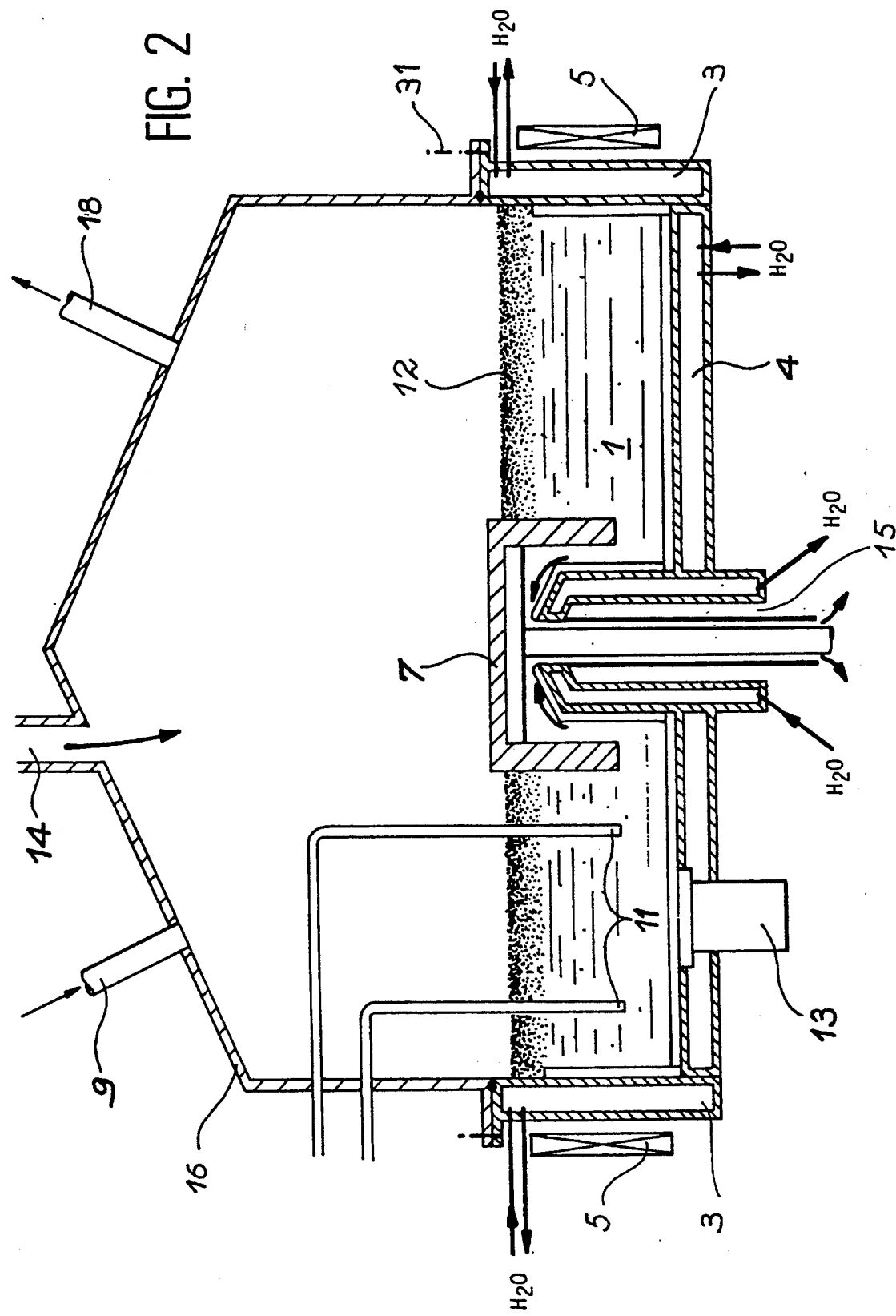
FIG. 2 A very diagrammatic sectional view of a furnace according to the invention.

FIG. 2 is a general diagram of an induction furnace according to the invention. In FIG. 2, the furnace of capacity 30 kg/h is constructed around a sectorized metal crucible cooled by a circulation of water and having a diameter of 50 cm. The constituent metal of the crucible is chosen as a function of its capacity to resist the corrosive vapours given off by the melted product (e.g. stainless steel if the melted product gives off nitrous vapours).

The cold crucible 3 is surrounded by an inductor 5 supplied with a high frequency alternating current of 10 to 100 kHz. If the product set on the cold wall is sufficiently insulating, the preferably single-turn inductor can serve as the crucible and then the sectorized crucible would be eliminated.

Figure 3:
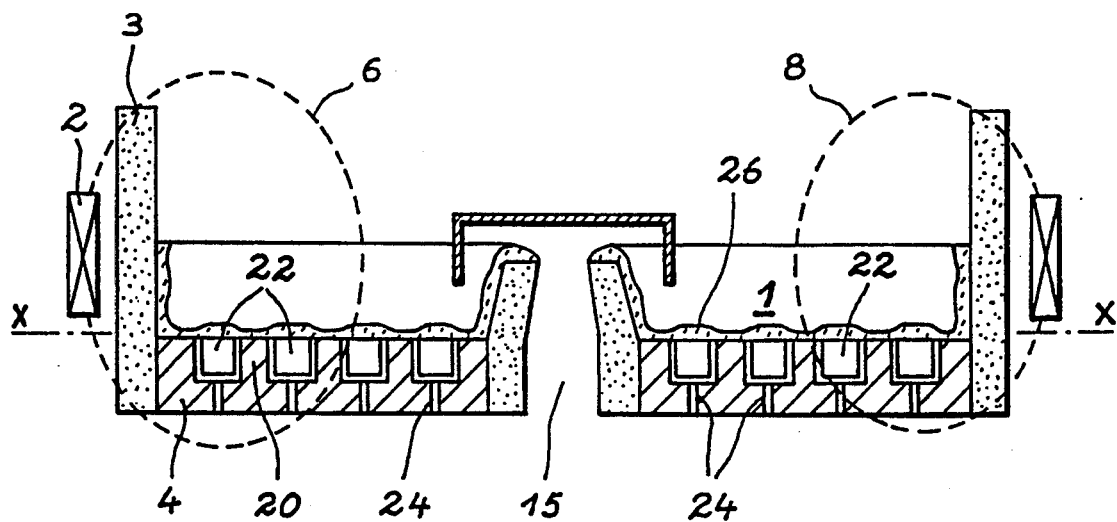
FIG. 3 In elevation 3a and in section 3b along XX of FIG. 3a, an advantageous embodiment of the hearth of the furnace of FIG. 2.
Figure 3:
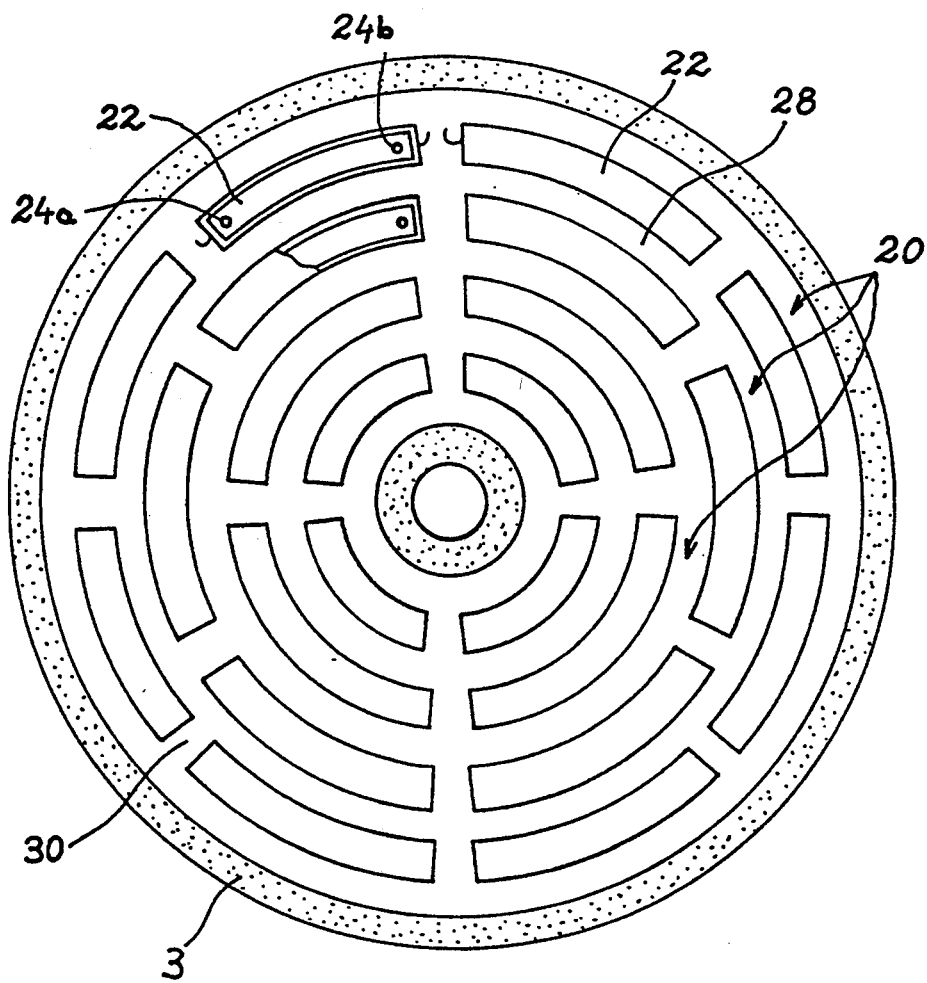

The molten bath 1 rests on a cooled hearth 4, which will be described in greater detail hereinafter relative to FIG. 3. According to the invention, the height of the molten bath is below 20% of the diameter of the furnace in order to reduce heat losses. This height must be sufficient to permit a stable melting, i.e. must exceed roughly 2 cm. In the non-limitative embodiment of FIG. 1, it is 8 cm.

The molten bath is permanently covered with a layer 12 of the unmelted mixture of the basic product. This mixture melts in the bottom of the layer 12 on contact with the molten product, the top of the layer remaining virtually cold and trapping most of the volatile elements escaping from the molten bath 1. A continuous, metered supply 14 of product to be melted makes it possible to keep constant the thickness of said layer 12 when its lower part melts and mixes with the molten product.

The bath temperature is permanently measured by one or more thermocouples 11. This temperature can be permanently regulated by acting on the current circulating in the inductor 5.

The molten bath level can be kept constant by an overflow system for the molten product through the discharge nozzle 15. The nozzle 15 can be formed from a hot refractory or metal tube traversing the cold hearth or, as indicated at 15, a cold metal tube having a shape selected in order to prevent the attachment and solidification of the molten product on the inner walls of the tube.

A cooled or uncooled, metal or refractory material bell 7 prevents the unmelted product from being introduced into the nozzle and makes it possible to sample the molten product below the surface level, so as to ensure a minimum residence time of the latter in the crucible.

An enclosure 16 placed above the furnace makes it possible to melt in a confined atmosphere and limit the gas flow which has to undergo depollution. A controlled flow air intake 9 facilitates the entrainment of pollutants through the pipe 18 to a gas treatment station and avoids the accumulation of condensible products on the walls of the cold crucible.

The furnace is designed so as to permit a stoppage, a cleaning and a restarting at very high speed, so as to be able to change the product to be melted without polluting the new product by the old product. Therefore the furnace is equipped with a refractory, metallic (cooled or uncooled) total emptying nozzle 13, which permits the complete emptying of the furnace. When the emptying of the molten bath is finished, heating is stopped by interrupting the current flowing in the inductor. There then remains a thin set glass layer against the walls of the crucible and the hearth, said layer not being adhesive. The cold crucible is raised by means of a gripping system 31 and the residual glass layer is removed. It is possible to give the crucible a slight conicity in order to facilitate this operation. The starting of melting takes place by various known methods appropriate for the product to be melted:

soluble member immersed in the glass and heated by the inductor surrounding the crucible;

insoluble member immersed in the glass, heated by the inductor surrounding the crucible and removed from the glass at the end of the starting operation;

radiant member placed above the glass and heated by the inductor surrounding the crucible;

radiant crown or arch;

gas jet.

On referring to FIGS. 3a and 3b, a description will be given of the preferred embodiments of the composite hearth constituting the induction furnace according to the invention. It is possible to see the cold furnace wall 3, the discharge nozzle 15, which in this case is central, and the hearth 4 which seals the lower part of the crucible. According to the invention, the hearth 4 is constituted by a refractory material 20, in which are embedded metal tubes or inserts 22 arranged concentrically in the refractory material 20 in accordance with concentric rings. Each of the inserts such as 22 has a cooling liquid inlet 24a and outlet directed towards the outside of the hearth. Several of these inlets and outlets 24b provided for the circulation of the cooling liquid are diagrammatically indicated at 24 in FIG. 3a.

The refractory zones, or spaces 28, 30 which, by permitting a regular penetration of the magnetic field produced by the inductor 2, enable a trajectory of the force lines in the manner indicated in dotted line form in the drawing and consequently the heating of a large part of the oxide mass 1. FIG. 3a shows the solid crust 26, whose thickness is greater above each of the metal inserts 22 and which protects the bottom of the hearth 4 against the corrosion of the oxides of the molten bath 1.

Obviously the embodiment described hereinbefore is of a non-limitative nature and the number and distribution of the metal inserts 22 within the refractory mass 20 are entirely left to the choice of the Expert, who will also be able to choose the structure which he desires as a function of the sought objectives. This also applies with respect to the location of the nozzle 15 for the discharge of the molten oxides to the outside, which is here shown in the centre of the crucible, but which could equally well be offcentred and located on the side thereof.

The space 28 of the refractory material 20 between two adjacent concentric rings is a compromise between a good transparency to the field (wide space) and an adequate cooling of the refractory material (narrow space), so as to ensure that the molten glass does not come into contact with the refractory material and therefore does not corrode it (generally a good compromise is provided by a space of 1 to 2 cm).

The space 30 of the refractory material 20 between two adjacent inserts of the same ring is a compromise between an adequate cooling of the refractory material (narrow space) and a good electrical insulation between two adjacent sectors (wide space). The electrical potential between two adjacent sectors increases with the voltage at the terminals of the inductor and decreases with the number of inserts per ring (e.g. for a voltage of 1000 V at the inductor terminals and 10 inserts per ring a space of 1 to 2 cm is adequate).

For example, in this diameter 50 cm furnace, the molten bath height is 8 cm, the melting capacity is 30 kg/h, the heat loss to the side walls is 38 kW for a flow density of 30 W/cm$^2$, the heat loss to the bottom is 20 kW for a flow density of 10 W/cm$^2$. The hearth proposed makes it possible to maintain an electrical efficiency of 80%, which leads to a specific energy consumption of 3 kWh/kg.

In conclusion, the furnace according to the invention makes it possible to provide products with a reduced refining level with a low specific consumption and a low cost, because the lower crucible is easier to construct and the high frequency generator has a low power level. As a result the inductor can also serve as the crucible, if this is permitted by the characteristics of the molten product.

What is claimed is:

1. A furnace for the continuous melting of an oxide mixture, comprising:

means for directly inducing high frequency heating currents in the oxide mixture;

an intake for continuously supplying the oxide mixture to be melted;

a nozzle for continuously discharging the melted mixture;

a circular metal crucible having cold walls; and a hearth formed from a refractory material having a plurality of independent metal inserts embedded in said refractory material, each of said metal inserts being constituted by a tube portion having an inlet and an outlet for a flow of cooling liquid, said hearth being transparent to the means for inducing high frequency heating currents in the oxide mixture and sufficiently cooled by said flow of cooling liquid to ensure the formation and maintenance of a protective solid crust of said oxide mixture at said hearth.

2. A furnace according to claim 1, wherein said hearth is shaped like a circular plate and the metal inserts are curved and distributed in the form of a series of concentric rings, each ring including several inserts separated from one another by the refractory material.

3. A furnace according to claims 1 or 2, wherein said hearth is equipped with a refractory nozzle for a complete emptying of the furnace.

4. A furnace according to claims 1 or 2, wherein said hearth is equipped with a refractory nozzle for a complete emptying of the furnace and said furnace is provided with an enclosure to confine an atmosphere above said oxide mixture, said enclosure being traversed by a controlled scavenging gas flow.

5. A furnace according to claim 1 or 2, wherein said hearth is equipped with a metallic nozzle for a complete emptying of the furnace.

6. A furnace according to claim 1 or 2, wherein said hearth is equipped with a metallic nozzle for a complete emptying of the furnace and said furnace is provided with an enclosure to confine an atmosphere above said oxide mixture, said enclosure being traversed by a controlled scavenging gas flow.

* * * * *